(12) United States Patent
Toyota et al.

(10) Patent No.: US 12,523,896 B2
(45) Date of Patent: Jan. 13, 2026

(54) PEEKING PREVENTION SYSTEM, METHOD OF USING PEEKING PREVENTION SYSTEM, AND METHOD OF PEEKING PREVENTION

(71) Applicant: NITTO DENKO CORPORATION, Ibaraki (JP)

(72) Inventors: Yuji Toyota, Ibaraki (JP); Masahiro Yaegashi, Ibaraki (JP); Masanori Otsuka, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 340 days.

(21) Appl. No.: 18/358,260

(22) Filed: Jul. 25, 2023

(65) Prior Publication Data

US 2024/0103307 A1 Mar. 28, 2024

(30) Foreign Application Priority Data

Sep. 28, 2022 (JP) ................................ 2022-154660

(51) Int. Cl.
*G02F 1/13* (2006.01)
*G02F 1/1335* (2006.01)

(52) U.S. Cl.
CPC ...... *G02F 1/1323* (2013.01); *G02F 1/133528* (2013.01)

(58) Field of Classification Search
None
See application file for complete search history.

(56) References Cited

U.S. PATENT DOCUMENTS 9,547,112 B2 1/2017 Mead et al.
2023/0131221 A1* 4/2023 Toyota .................. G02F 1/1323
359/240

FOREIGN PATENT DOCUMENTS

WO 2021/200723 A1 10/2021

* cited by examiner

*Primary Examiner* — Phu Vu
(74) *Attorney, Agent, or Firm* — WHDA, LLP

(57) ABSTRACT

A peeking prevention system includes: a display device having a display plane from which to emit linearly polarized light; a partition to delimit from the surroundings a space in which displaying is to be provided by the display device, the partition having a light-transmitting portion through which the inside of the space is viewable; and an optical stack placeable in opposing relationship with the display plane of the display device. The light-transmitting portion includes a transparent substrate and a first polarizing layer, the first polarizing layer having a first absorption axis that is parallel to a first direction. The optical stack includes a second polarizing layer having a second absorption axis that is parallel to a second direction, the second direction being orthogonal to the first direction, and a ½ wave plate at a side of the second polarizing layer facing the display plane.

14 Claims, 12 Drawing Sheets

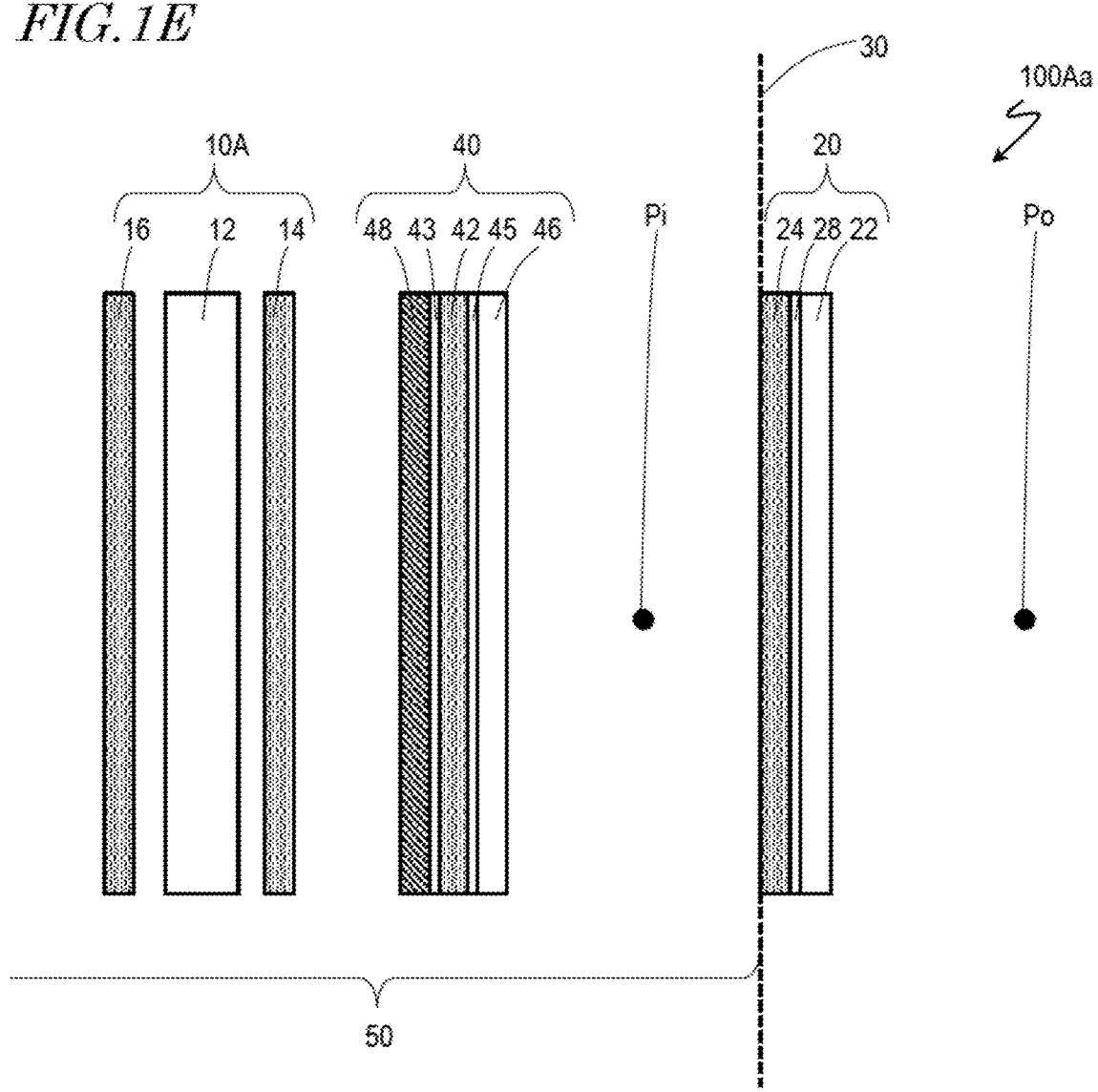

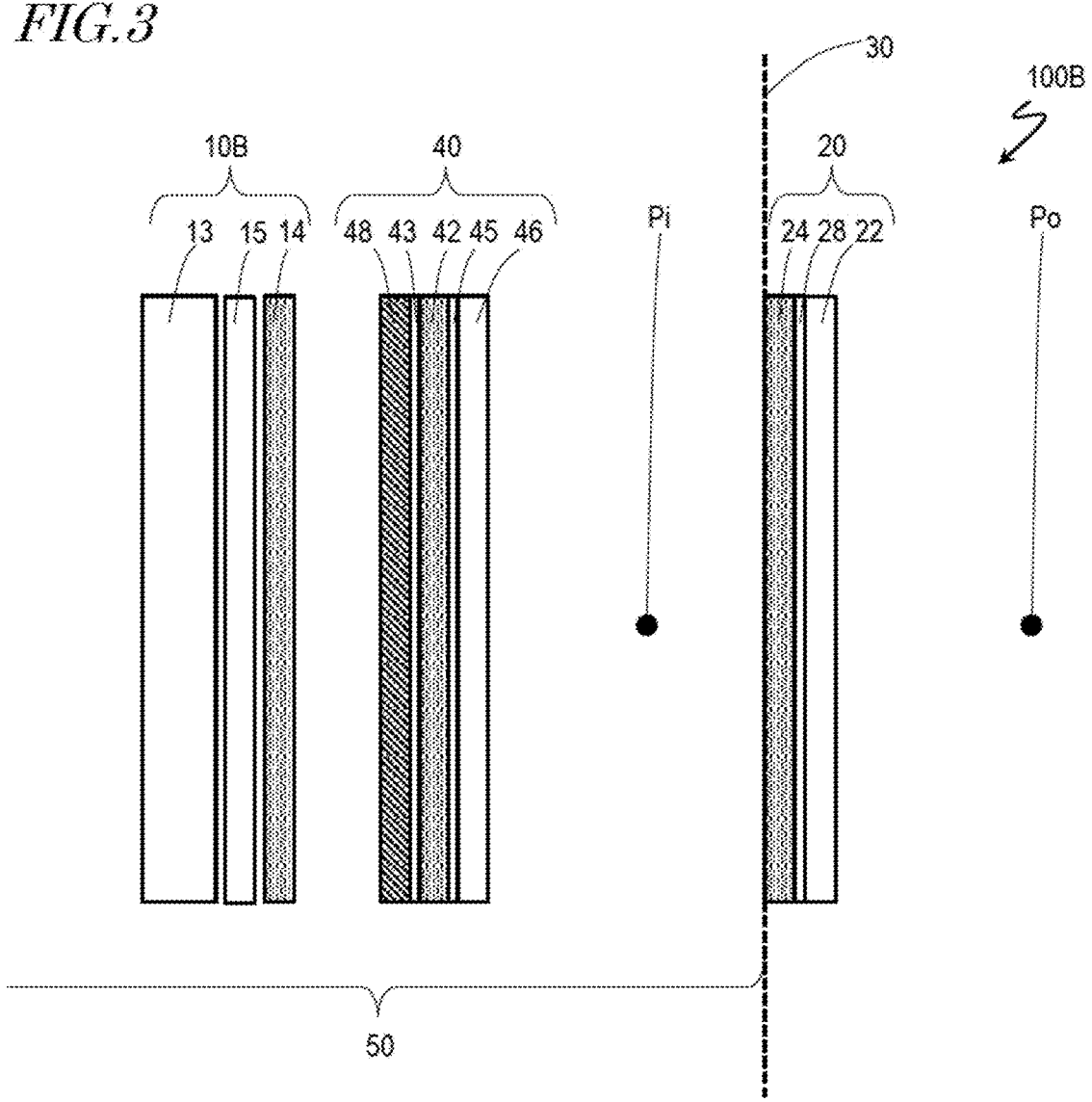

PEEKING PREVENTION SYSTEM, METHOD OF USING PEEKING PREVENTION SYSTEM, AND METHOD OF PEEKING PREVENTION

BACKGROUND

1. Technical Field

The present invention relates to a peeking prevention system, a method of using the peeking prevention system, and a method of peeking prevention.

2. Description of the Related Art

Display devices that use polarized light to perform displaying, such as liquid crystal display devices, are widely used. Large-sized display devices are often installed in conference rooms as monitors for presentation or video conferencing purposes, for example.

On the other hand, the use of open conference rooms that provide a sense of spatial openness is becoming more widespread. For example, the walls (or partitions) of a conference room may be made of glass panels (or acrylic panels) to provide a sense of openness because of their transparency. While transparency of the walls provides a sense of openness, it can be a problem if an outside stranger peeks at the information that is being displayed on a display device in the conference room. To cope with this situation, for example, frosted glass or colored panels are used to make the transparent walls opaque at eye level. However, when the transparent walls are partly made opaque in this way, the sense of openness will be compromised.

The specification of USP No. 9547112 (hereinafter "Patent Document 1") discloses a system where a polarizing filter that absorbs polarized light in a direction parallel to the polarization direction of polarized light which is emitted from a display device (i.e., a polarizing filter that transmits polarized light in a direction orthogonal to the polarization direction of polarized light which is emitted from the display device) is placed close to a transparent window, thereby preventing the information that is displayed on the display device from being seen from the outside, while still allowing the inside of the room to be seen through the transparent window.

International Publication No. 2021/200723 (hereinafter "Patent Document 2") discloses a peeking prevention system that provides improved convenience over the system of Patent Document 1). What can be prevented from being seen from the outside in the system described in Patent Document 1 is only the information that is displayed by using light being polarized in a direction parallel to the absorption axis of the polarizing filter that is provided on the window. The peeking prevention system of Patent Document 2 includes an optical stack that is opposed to a display plane of a display device within a space, the optical stack including a phase difference layer having an in-plane retardation of 4000 nm or more. Because of including the optical stack, irrespective of the polarized light that is emitted from the display device within the space, the peeking prevention system of Patent Document 2 can prevent information that is displayed on the display device from being seen from outside of the space.

SUMMARY

In the peeking prevention systems of Patent Documents 1 and 2, further improvements in convenience are desired. The details thereof will be described later.

The present invention has been made in view of the above problems, and an objective thereof is to provide a novel peeking prevention system, a method of using the same, and a method of peeking prevention with improved convenience.

According to embodiments of the present invention, means for solution as recited in the following Items are provided.

[Item 1]

A display device having a display plane from which to emit linearly polarized light;
    a partition to delimit from surroundings a space in which displaying is to be provided by the display device, the partition having a light-transmitting portion through which the inside of the space is viewable; and
    an optical stack placeable in opposing relationship with the display plane of the display device, wherein,
    the light-transmitting portion includes a transparent substrate and a first polarizing layer, the first polarizing layer having a first absorption axis that is parallel to a first direction; and
    the optical stack includes
        a second polarizing layer having a second absorption axis that is parallel to a second direction, the second direction being orthogonal to the first direction, and
        a ½ wave plate disposed at a side of the second polarizing layer facing the display plane.

[Item 2]

The peeking prevention system of Item 1, wherein,
    the display device includes a third polarizing layer on a front surface of the display plane; and
    the third polarizing layer has a third absorption axis that is parallel to a third direction, the third direction not being orthogonal to the first direction.

[Item 3]

The peeking prevention system of Item 2, wherein an angle made by a slow axis of the ½ wave plate and the third direction is not less than 35° and not more than 55°.

[Item 4]

The peeking prevention system of any one of Items 1 to 3, wherein the ½ wave plate comprises a discotic liquid crystal.

[Item 5]

The peeking prevention system of any one of Items 1 to 3, wherein the ½ wave plate comprises a norbornene-based resin.

[Item 6]

The peeking prevention system of any one of Item 2, Item 3, Item 4 as depending from Item 2 or 3, and Item 5 as depending from Item 2 or 3, wherein the third direction is parallel to the first direction.

[Item 7]

The peeking prevention system of any one of Item 2, Item 3, Item 4 as depending from Item 2 or 3, and Item 5 as depending from Item 2 or 3, wherein an angle made by the third direction and the first direction is 45°.

[Item 8]

The peeking prevention system of any one of Items 1 to 7, wherein the optical stack further includes a protection layer disposed at an opposite side of the second polarizing layer from the ½ wave plate.

[Item 9]

The peeking prevention system of any one of Items 1 to 8, wherein the optical stack is disposed with an air layer between itself and the display device.

[Item 10]

The peeking prevention system of any one of Items 1 to 9, wherein the first direction is a vertical direction and the second direction is a horizontal direction.

[Item 11]

The peeking prevention system of any one of Items 1 to 10, wherein the space is a personal workspace.

[Item 12]

A method of using the peeking prevention system of any one of Items 1 to 11, wherein, if the display plane appears tinted in a purple color to a user being in the space and watching the display plane of the display device through the optical stack, the display device is used in the space without the optical stack being placed in opposing relationship with the display plane; and if the display plane does not appear tinted in a purple color to a user being in the space and watching the display plane of the display device through the optical stack, the display device is used in the space while the optical stack is placed in opposing relationship with the display plane.

[Item 13]

A method of peeking prevention for use with a peeking prevention system that includes:

a display device; and a partition to delimit from surroundings a space in which displaying is to be provided by the display device, the partition having a light-transmitting portion through which the inside of the space is viewable, the light-transmitting portion including: a transparent substrate; and a first polarizing layer being disposed at a side of the transparent substrate facing the space and having a first absorption axis parallel to a first direction, wherein the method comprises placing an optical stack to be in opposing relationship with a display plane of the display device, to reduce a transmittance when the display plane is viewed through the light-transmitting portion, the optical stack including: a second polarizing layer having a second absorption axis that is parallel to a second direction, the second direction being orthogonal to the first direction; and a ½ wave plate disposed at a side of the second polarizing layer facing the display plane.

[Item 14]

The method of peeking prevention of Item 13, further comprising providing the optical stack by attaching together the second polarizing layer and the ½ wave plate by roll-to-roll method.

According to embodiments of the present invention, a novel peeking prevention system, a method of using the same, and a method of peeking prevention with improved convenience are provided.

BRIEF DESCRIPTION OF THE DRAWINGS

FIG. 1E is a schematic plan view of a peeking prevention system 100Aa, as still another variation of the peeking prevention system 100A, as seen from above.

FIG. 3 is a schematic plan view showing a peeking prevention system 100B according to another embodiment of the present invention as seen from above.

DETAILED DESCRIPTION

Hereinafter, with reference to the drawings, a peeking prevention system and a method of peeking prevention according to embodiments of the present invention will be described. Embodiments of the present invention are not limited to what will be illustrated hereinbelow.

Figure 1A:
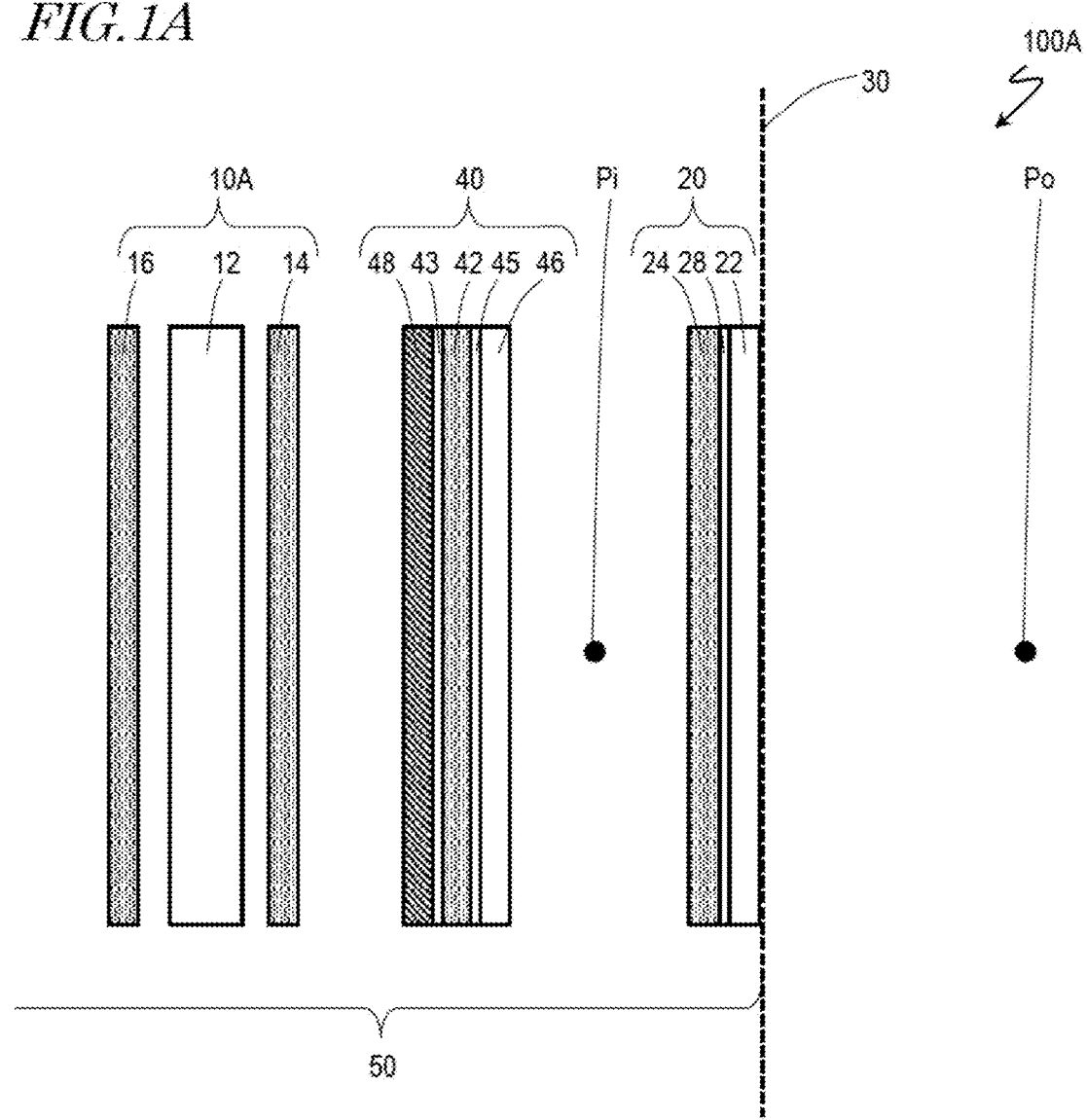
FIG. 1A is a schematic plan view showing a peeking prevention system 100A according to an embodiment of the present invention as seen from above.
Figure 1B:
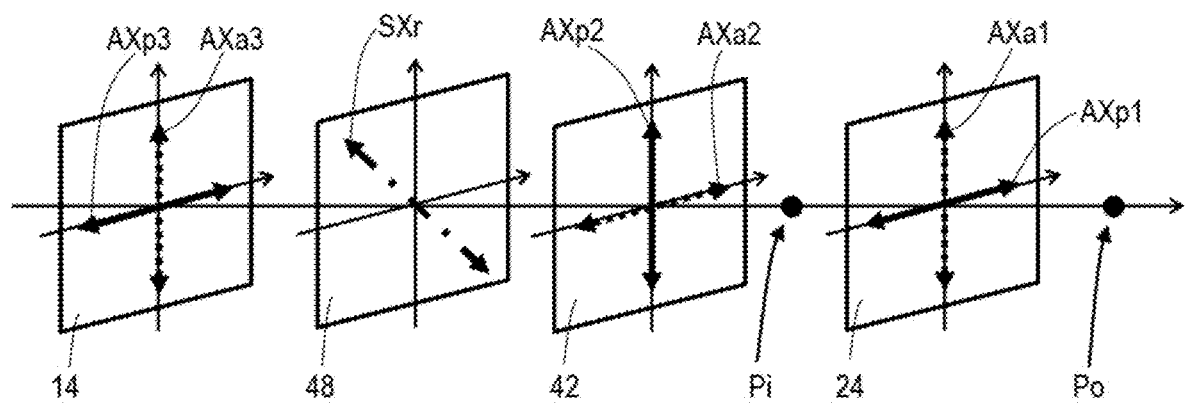
FIG. 1B is a schematic diagram showing a manner in which polarized light emitted from a display device 10A is transmitted through a phase difference layer and polarizing layers, in the peeking prevention system 100A.

FIG. 1A is a schematic plan view showing a peeking prevention system 100A according to an embodiment of the present invention as seen from above. FIG. 1B is a schematic diagram showing a manner in which polarized light emitted from a display device 10A is transmitted through a phase difference layer and polarizing layers.

As shown in FIG. 1A, the peeking prevention system 100A includes: a display device 10A to emit linearly polarized light from a display plane; a partition 30 to delimit from the surroundings a space 50 in which displaying is to be provided by the display device 10A, the partition 30 having a light-transmitting portion 20 through which the inside of the space 50 is viewable; and an optical stack 40 placeable in opposing relationship with the display plane of the display device 10A. Hereinafter, for simplicity, the display plane may be denoted by the same reference numeral 10A as the display device. The display device which is included in the peeking prevention system according to an embodiment of the present invention emits linearly polarized light. The linearly polarized light which is emitted from a display device included in a peeking prevention system according to an embodiment of the present invention has a degree of polarization which is e.g. 70% or more, preferably 97.0% or more, more preferably 99.0% or more, and even more preferably 99.5% or more. Herein, as the display device 10A, a liquid crystal display device 10A will be illustrated.

The light-transmitting portion 20 includes: a transparent substrate 22; and a first polarizing layer 24 having a first absorption axis AXa1 (see FIG. 1B) that is parallel to a first direction. The optical stack 40 includes: a second polarizing layer 42 having a second absorption axis AXa2 (see FIG. 1B) that is parallel to a second direction, which is orthogonal to the first direction; and a ½ wave plate (λ/2 plate) 48 disposed at a side of the second polarizing layer 42 facing the display plane 10A. When it is said that the first direction and the second direction are orthogonal, it is meant that the angle made by the first direction and the second direction has a margin of error within ±10° from 90°. An angle made by a slow axis SXr of the ½ wave plate 48 and the polarization direction of polarized light that is incident on the ½ wave plate 48 is e.g. not less than 35° and not more than 55°, and preferably 45°. In the present specification, an angle made by a given axis (an absorption axis, a polarization axis, or a slow axis; "first axis") and another axis (an absorption axis, a polarization axis, or a slow axis that is different from the first axis; "second axis") has the following meaning, given that a smaller angle and a larger angle emerge as a result of a straight line parallel to the first axis intersecting a straight line parallel to the second axis, any such angle being represented by a value of 0 or more: the smaller angle.

The liquid crystal display device 10A includes: a liquid crystal cell 12; a polarizing layer (which may be referred to as a "third polarizing layer" or a "front-side polarizing layer") 14 disposed at a viewer's side of the liquid crystal cell 12; and a polarizing layer (which may be referred to as a "rear-side polarizing layer") 16 disposed on the backlight side of the liquid crystal cell 12. The liquid crystal cell 12 includes a liquid crystal layer as a display medium layer. The front-side polarizing layer 14 has a third absorption axis AXa3 that is parallel to a third direction. Herein, it is assumed that the third absorption axis AXa3 has an azimuth angle of 90°, and that a polarization axis AXp3 of the front-side polarizing layer 14 has an azimuth angle of 0°. When the display plane 10A as viewed by a viewer is regarded as a clock face, the azimuth angle is 0° at 3 o'clock and reads positive counterclockwise.

As will be described with reference also to FIG. 1B below, the peeking prevention system 100A includes the optical stack 40, which prevents information that is displayed on the display device 10A from being seen from outside of the space 50.

In this example, the azimuth angle of the first absorption axis AXa1 of the first polarizing layer 24 provided in the light-transmitting portion 20 is 90° (i.e., the first absorption axis AXa1 is parallel to the vertical direction), whereas the azimuth angle of the second absorption axis AXa2 of the second polarizing layer 42 included in the optical stack 40 is 0° (i.e., the second absorption axis AXa2 is parallel to the horizontal direction). A polarization axis AXp1 of the first polarizing layer 24 is orthogonal to the first absorption axis AXa1 of the first polarizing layer 24, whereas a polarization axis AXp2 of the second polarizing layer 42 is orthogonal to the second absorption axis AXa2 of the second polarizing layer 42.

Light which is emitted from the display device 10A is linearly polarized light that has been transmitted through the front-side polarizing layer 14; therefore, its polarization direction is orthogonal to the third absorption axis AXa3 of the front-side polarizing layer 14, and is parallel to the polarization axis AXp3 of the front-side polarizing layer 14. In this example, polarized light emitted from the display device 10A has a polarization direction that is orthogonal to the first absorption axis AXa1 of the first polarizing layer 24 provided in the light-transmitting portion 20, and therefore can be transmitted through the light-transmitting portion 20. Thus, without the optical stack 40, information that is displayed on the display device 10A would be seen by a person Po outside the space 50. On the other hand, in the peeking prevention system 100A, the optical stack 40 having the ½ wave plate 48 is provided between the display device 10A and the light-transmitting portion 20. The ½ wave plate 48 causes the polarization direction of linearly polarized light having a polarization direction which makes an angle α with its slow axis SXr to be rotated by 2α. In the illustrated example, the slow axis SXr of the ½ wave plate 48 has an azimuth angle of 135°, and the ½ wave plate 48 and the front-side polarizing layer 14 are disposed so that an angle made by the slow axis SXr of the ½ wave plate 48 and the polarization axis AXp3 of the front-side polarizing layer 14 is 45°. When linearly polarized light that has been transmitted through the front-side polarizing layer 14 is transmitted through the ½ wave plate 48, its polarization direction is rotated by 90°; as a result, it becomes polarized light having a polarization direction which is parallel to the polarization axis AXp2 of the second polarizing layer 42, and is incident on the second polarizing layer 42 and transmitted through the second polarizing layer 42. The light that reaches a person Pi in the space 50 is polarized light that has been transmitted through the second polarizing layer 42, i.e., polarized light whose polarization direction is parallel to the polarization axis AXp2. This polarized light allows information that is displayed on the display plane 10A to be provided to the person Pi in the space 50.

Since the polarization axis AXp2 of the second polarizing layer 42 and the first absorption axis AXa1 of the first polarizing layer 24 are parallel to each other, polarized light having been transmitted through the second polarizing layer 42 cannot be transmitted through the first polarizing layer 24. Therefore, the person Po outside the space 50 is not able to see the information being displayed on the display plane 10A. Note that even when the angle made by the first absorption axis AXa1 of the first polarizing layer 24 and the second absorption axis AXa2 of the second polarizing layer 42 is not 90°, so long as the margin of error relative to 90° is within ±10°, the displaying can be made substantially non-visible when the person Po outside the space 50 looks at the display plane 10A via the light-transmitting portion 20.

As will be specifically illustrated in Experimental Examples below, the peeking prevention system 100A can improve visibility of information that is displayed on the display device 10A as perceived by the person Pi in the space 50, over the peeking prevention system described in Patent Document 2. A peeking prevention system 900A according to Comparative Example, which corresponds to the peeking prevention system described in Patent Document 2, will be described with reference to FIG. 9A and FIG.

Figure 9A:
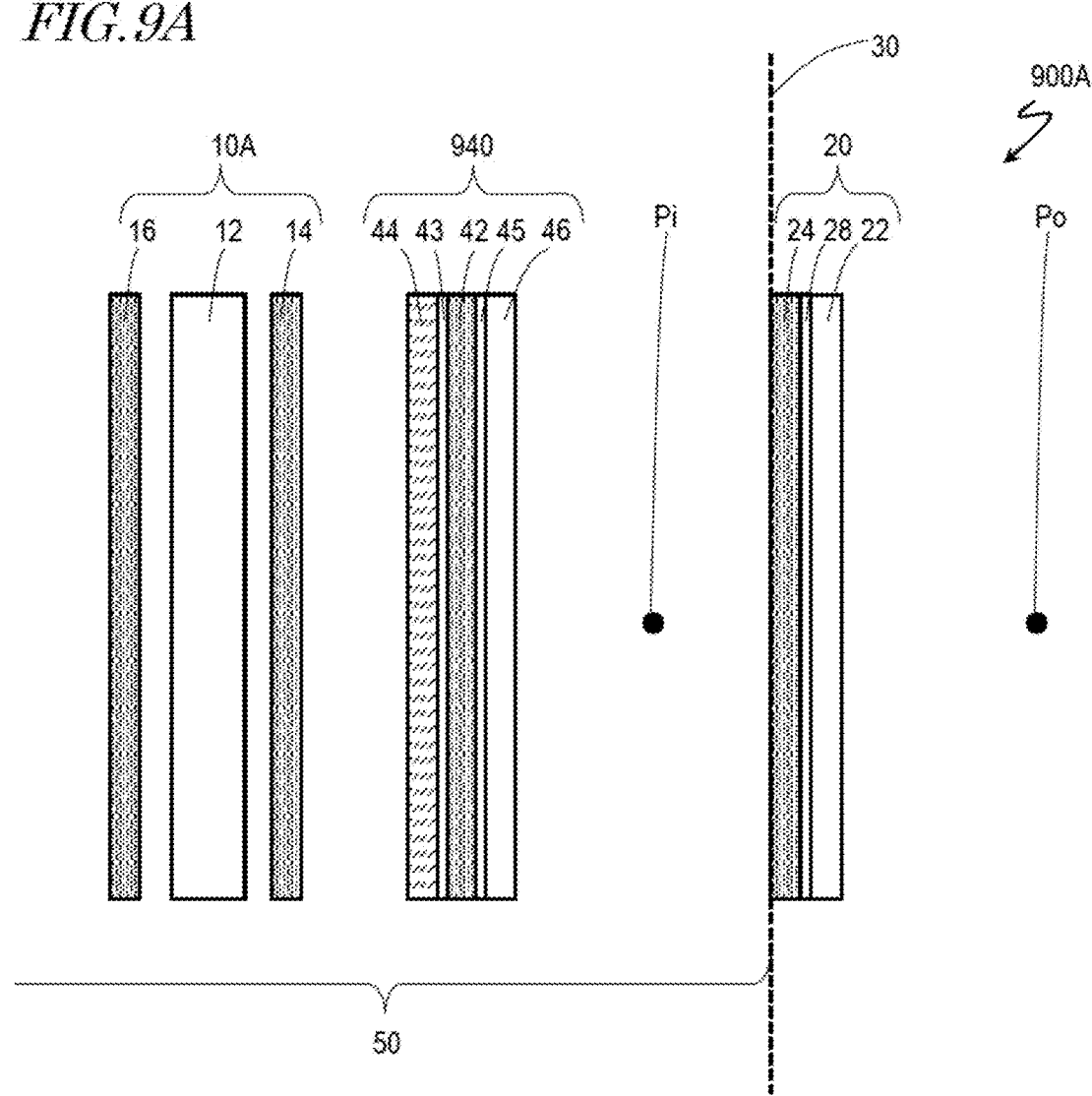
FIG. 9A is a schematic plan view showing a peeking prevention system 900A according to Comparative Example as seen from above.

9B. FIG. 9A is a schematic plan view of the peeking prevention system 900A according to Comparative Example as seen from above; and FIG. 9B is a schematic diagram showing a manner in which polarized light emitted from a display device 10A is transmitted through a phase difference layer and polarizing layers in the peeking prevention system 900A according to Comparative Example.

Figure 9B:
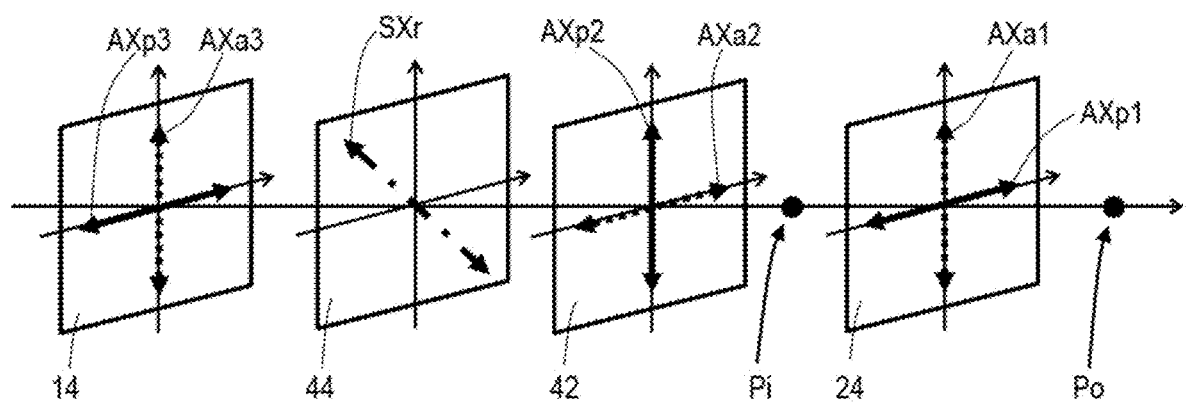
FIG. 9B is a schematic diagram showing a manner in which polarized light emitted from a display device 10A is transmitted through a phase difference layer and polarizing layers, in the peeking prevention system 900A according to Comparative Example.

As shown in FIG. 9A and FIG. 9B, the peeking prevention system 900A according to Comparative Example differs from the peeking prevention system 100A in that an optical stack 940 having a phase difference layer 44 is included instead of the optical stack 40 having the ½ wave plate 48. The phase difference layer 44 has an in-plane retardation of 4000 nm or more, and is able to reduce the degree of polarization (i.e., depolarize) of polarized light having a polarization direction that intersects the slow axis of the phase difference layer 44. When light emitted from the display device 10A, i.e., polarized light that has been transmitted through the front-side polarizing layer 14, is transmitted through the phase difference layer 44 having an in-plane retardation of 4000 nm or more, its degree of polarization is reduced. When light with the reduced degree of polarization is incident on the second polarizing layer 42 and transmitted through the second polarizing layer 42, it becomes polarized light having a polarization direction which is parallel to the polarization axis AXp2 of the second polarizing layer 42. Light that reaches the person Pi in the space 50 is polarized light that has been transmitted through the second polarizing layer 42. This polarized light allows information that is displayed on the display plane 10A to be provided to the person Pi in the space 50. The person Po outside the space 50 cannot see the information being displayed on the display plane 10A.

In the peeking prevention system 900A according to Comparative Example, too, it is possible to prevent information that is displayed on the display device 10A from being seen from outside of the space 50. However, according to a study by the inventors, regarding the light emitted from the display device 10A, there is not enough transmittance for the light transmitted through the optical stack 940 in the peeking prevention system 900A according to Comparative Example; therefore, the person Pi in the space 50 cannot enjoy sufficient visibility of the information being displayed on the display plane 10A. In contrast, instead of the optical stack 940 having the phase difference layer 44, the peeking prevention system 100A according to an embodiment of the present invention includes the optical stack 40 having the ½ wave plate 48, thereby being able to improve transmittance for light transmitted through the optical stack 40. Because of improved visibility of the information being displayed on the display plane 10A, the peeking prevention system 100A is easy to use for the person who uses it; that is, it provides good convenience.

The optical stack 40 is produced by attaching together the ½ wave plate 48 and the second polarizing layer 42 by roll-to-roll method, for example. Although the method for attaching together the ½ wave plate 48 and the second polarizing layer 42 is not limited to a roll-to-roll method, use of a roll-to-roll method will allow for improving mass producibility.

Variations for the peeking prevention system 100A will be described.

Figure 1C:
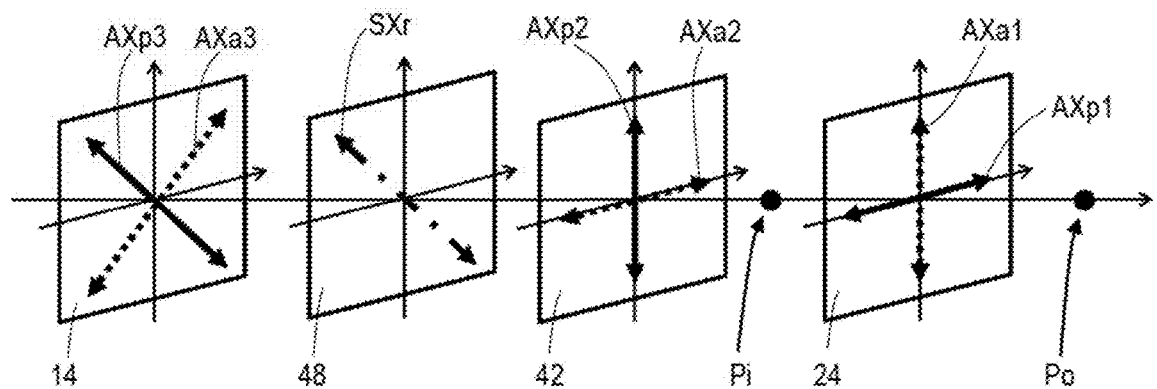
FIG. 1C is a schematic diagram showing a manner in which polarized light emitted from a display device 10A is transmitted through a phase difference layer and polarizing layers, in a variation of the peeking prevention system 100A.

A peeking prevention system of the variation shown in FIG. 1C differs from the peeking prevention system 100A described with reference to FIG. 1A and FIG. 1B in that the third absorption axis AXa3 of the front-side polarizing layer 14 has an azimuth angle of 135° and that the polarization axis AXp3 of the front-side polarizing layer 14 has an azimuth angle of 45°. The peeking prevention system of the variation shown in FIG. 1C is arranged so that an angle made by the slow axis SXr of the ½ wave plate 48 and the polarization axis AXp3 of the front-side polarizing layer 14 is 90°. Even if linearly polarized light that has been transmitted through the front-side polarizing layer 14 is transmitted through the ½ wave plate 48, its polarization direction does not change. In other words, light that has been transmitted through the ½ wave plate 48 is polarized light having a polarization direction which is parallel to the polarization axis AXp3 of the front-side polarizing layer 14. The light that has been transmitted through the ½ wave plate 48 is incident on the second polarizing layer 42, and within the incident light on the second polarizing layer 42, polarized light having a polarization direction which is parallel to the polarization axis AXp2 of the second polarizing layer 42 is transmitted through the second polarizing layer 42. Therefore, in the peeking prevention system of the variation shown in FIG. 1C, too, information that is displayed on the display device 10A can be prevented from being seen from outside of the space 50. From the standpoint of visibility of the information that is displayed on the display device 10A, the peeking prevention system of the variation shown in FIG. 1C may not be as good as the peeking prevention system 100A, but is not inferior to the peeking prevention system 900A according to Comparative Example, as will be illustrated by Experimental Examples below.

A peeking prevention system of another variation FIG. 1D differs from the peeking prevention system 100A described with reference to FIG. 1A and FIG. 1B in that the third absorption axis AXa3 of the front-side polarizing layer 14 has an azimuth angle of 0° and that the polarization axis AXp3 of the front-side polarizing layer 14 has an azimuth angle of 90°. In the peeking prevention system of the alternative variation shown in FIG. 1D, the optical stack 40 is not needed in order to prevent information that is displayed on the display device 10A, from being seen from outside of the space 50. A user (i.e., the person Pi in the space 50) may simply use the display device 10A, in the space 50, without having to place the optical stack 40 between the user and the display plane 10A.

Figure 1D:
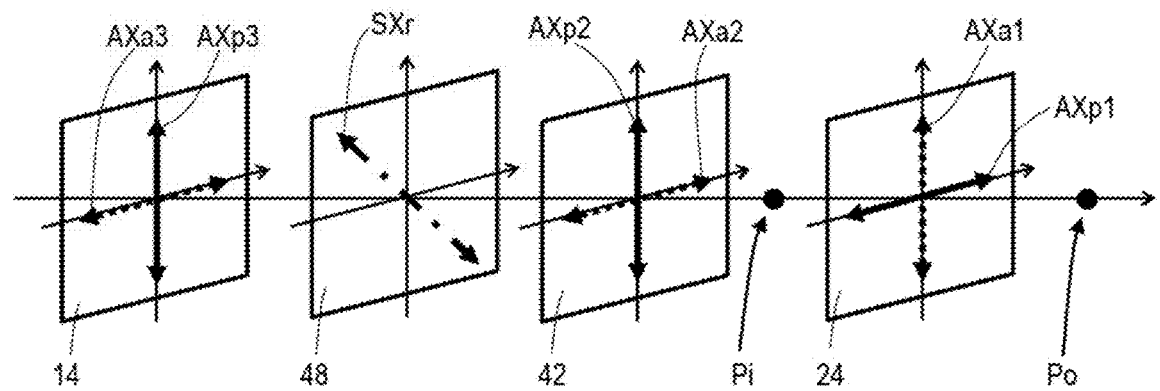
FIG. 1D is a schematic diagram showing a manner in which polarized light emitted from a display device 10A is transmitted through a phase difference layer and polarizing layers, in another variation of the peeking prevention system 100A.

The peeking prevention system of the alternative variation shown in FIG. 1D is arranged so that an angle made by the slow axis SXr of the ½ wave plate 48 and the polarization axis AXp3 of the front-side polarizing layer 14 is 45°. When linearly polarized light that has been transmitted through the front-side polarizing layer 14 is transmitted through the ½ wave plate 48, its polarization direction is rotated by 90°, and therefore it becomes polarized light having a polarization direction which is orthogonal to the polarization axis AXp2 of the second polarizing layer 42. Thus, it cannot be transmitted through the second polarizing layer 42 when being incident upon the second polarizing layer 42. As a result, in the peeking prevention system of the alternative variation shown in FIG. 1D, the person Pi in the space 50 watching the display plane 10A, through the optical stack 40 cannot see the information being displayed on the display plane 10A.

In the peeking prevention system of the alternative variation shown in FIG. 1D, the person Pi in the space 50 watching the display plane 10A through the optical stack 40 will perceive the display plane 10A as being tinted, e.g., purple. Purple is only an example, and may vary with the in-plane retardation of the ½ wave plate 48. The user may determine the need for the optical stack 40 depending on whether the display plane 10A appears tinted (e.g., purple)

when watching the display plane 10A through the optical stack 40 in the space 50, and use the peeking prevention system in according manners. When the display plane 10A appears tinted (e.g., purple), the user may use the display device 10A in the space 50 without the optical stack 40 being placed in opposing relationship with the display plane 10A. When the display plane 10A does not appear tinted (e.g., purple), the user may use the display device 10A in the space 50 while the optical stack 40 is placed in opposing relationship with the display plane 10A.

The peeking prevention system 100A and its variations may be in various forms of use. For example, a possible scenario is where, in addition to a display device as a shared monitor that is installed within the space 50, a display device (e.g., a laptop computer, tablet, etc.) for personal use may be brought into the space 50 to be used. As in the example shown in FIG. 4 to be described later, the display device to be used in the space 50 as a personal workspace may be nothing but a display device for personal use. The polarization direction of polarized light that is emitted from the display plane differs from display device to display device, and the user may not know the polarization direction of linearly polarized light that is emitted from the display plane of the display device. With the aforementioned method of using the peeking prevention system, when using a display device in the space 50, there is no need for the user to check in advance the polarization direction of linearly polarized light that is emitted by that display device from the display plane (i.e., the direction of the absorption axis of a polarizing layer which is included at the front surface of the display plane). Thus, the method is easy for the user to use; that is, it provides good convenience.

Furthermore, with the above method of using the peeking prevention system, which involves determination of the need for the optical stack 40, the user will perceive a visual change (i.e., the display plane 10A appearing tinted, e.g., purple, as seen through the optical stack 40) when the optical stack 40 is not needed. The peeking prevention systems of Patent Documents 1 and 2 had a problem in that it cannot be known from inside the space whether blinding for the information is being achieved or not. The method of using the peeking prevention system according to an embodiment of the present invention can give the user the peace of mind of knowing that blinding is in effect such that the information being displayed on the display plane 10A cannot be seen from outside of the space 50.

The ½ wave plate 48 typically has an in-plane retardation of 275 nm (wavelength λ=550 nm) because, in general, it is design practice to use 550 nm, for which the highest luminosity factor exists, as the wavelength λ. The in-plane retardation (in-plane phase difference) is defined as $(nx-ny) \times d$, where d is the thickness of the phase difference layer; nx and ny are principal refractive indices within the plane of the phase difference layer; and nz is a principal refractive index in the normal direction. Without being limited to this, the in-plane retardation of the ½ wave plate 48 is e.g. not less than 190 nm and not more than 390 nm, and preferably not less than 240 nm and not more than 300 nm.

The ½ wave plate 48 is an alignment fixed layer of liquid crystal molecules, for example. In the present specification, an "alignment fixed layer" means a layer in which liquid crystal molecules are aligned in a predetermined direction, their alignment being fixed. Note that "alignment fixed layer", by definition, is a concept that encompasses a cured-alignment layer that is obtained by curing a liquid crystal monomer. The liquid crystal molecules may be rod-shaped liquid crystal molecules, discotic (disc-shaped) liquid crystal molecules, or a combination thereof. A typical example of a ½ wave plate 48 containing a discotic liquid crystal may be a so-called negative A plate having refractive index characteristics such that nx=nz>ny.

Discotic liquid crystal molecules have a disc-shaped molecular structure with a cyclic matrix such as benzene, 1,3,5-triazine, or calixarene at the center of the molecule, in which straight-chain alkyl groups, alkoxy groups, substituted benzoyloxy groups, or the like are radially substituted as their side chains. Examples of discotic liquid crystals are: benzene derivatives, triphenylene derivatives, truxene derivatives, and phthalocyanine derivatives as described in a research report by C. Destrade et al. in Mol. Cryst. Liq. Cryst. vol. 71, p. 111 (1981); cyclohexane derivatives as described in a research report by B. Kohne et al. in Angew. Chem. vol. 96, p. 70 (1984); and azacrown-based and phenylacetylene-based macrocycles as described in a research report by J. M. Lehn et al. in J. Chem. Soc. Chem. Commun., p. 1794 (1985), a research report by J. Zhang et al. in J. Am. Chem. Soc. vol. 116, p. 2655 (1994). Other examples of discotic liquid crystals may include discotic liquid crystals that are described in Japanese Laid-Open Patent Publication No. 2006-133652, Japanese Laid-Open Patent Publication No. 2007-108732, Japanese Laid-Open Patent Publication No. 2010-244038, and Japanese Laid-Open Patent Publication No. 2014-214177. The entire disclosure of each of the above literature and publications is incorporated herein by reference.

As the ½ wave plate 48, a stretched polymer film containing a norbornene-based resin may be used. An example of such a ½ wave plate is described in Japanese Laid-Open Patent Publication No. 2006-072309. The entire disclosure of Japanese Laid-Open Patent Publication No. 2006-072309 is incorporated herein by reference.

There is no particular limitation as to the materials and production methods for the first polarizing layer 24, the second polarizing layer 42, the front-side polarizing layer 14, and the rear-side polarizing layer 16. They are typically made of polyvinyl alcohol (PVA) films containing iodine.

In FIG. 1A, the light-transmitting portion 20 is formed in a part of the partition 30. The partition 30 may be composed of a transparent substrate, with the first polarizing layer 24 being provided in only a portion thereof. In this case, the portion including the first polarizing layer 24 becomes the light-transmitting portion 20. A portion of the partition 30 that includes a portion including the light-transmitting portion 20 may be made of a light-transmitting material, while the remainder of the partition 30 may be made of a material having a low transmittance for visible light. Without being limited to the illustrated example, the entire partition 30 may be composed of the light-transmitting portion 20. In the illustrated example, the light-transmitting portion 20 is provided by the first polarizing layer 24 existing (e.g. being attached) on a principal face of the partition 30 that is closer to the space 50. In the illustrated example, the first polarizing layer 24 is supported by the transparent substrate 22, which is disposed on the principal face of the partition 30 that is closer to the space 50. In other words, the transparent substrate 22 exists between the first polarizing layer 24 and the partition 30. The first polarizing layer 24 is attached onto the transparent substrate 22 via the adhesion layer 28. The adhesion layer 28 is made of an adhesive that is optically transparent (optical clear adhesive), for example. The transparent substrate 22 may also be attached to the principal face of the partition 30 that is closer to the space 50 via an adhesion layer that is made of a similar material. The relative positioning between the first polarizing layer 24 and the transparent substrate 22 may be reversed. That is, the first polarizing layer 24 may exist between the transparent substrate 22 and the partition 30. As in a peeking prevention system 100Aa of the variation shown in FIG. 1E, the light-transmitting portion 20 may be provided by the first polarizing layer 24 existing (e.g. being attached) on a principal face of the partition 30 that is away from the space 50. In the example shown in FIG. 1E, too, the relative positioning between the first polarizing layer 24 and the transparent substrate 22 may be reversed.

Herein, the optical stack 40 further includes a protection layer 46 that is disposed at an opposite side of the second polarizing layer 42 from the ½ wave plate 48. In other words, the optical stack 40 includes: the second polarizing layer 42; the ½ wave plate 48 being disposed at the side of one principal face of the second polarizing layer 42; and the protection layer 46 being disposed at an opposite side of the second polarizing layer 42 from the ½ wave plate 48. The protection layer 46 is attached onto the second polarizing layer 42 via an adhesion layer 45. The protection layer 46 and the adhesion layer 45 may be omitted. As the adhesion layers 43 and 45, adhesion layers made of an adhesive that is optically transparent (optical clear adhesive) are preferably used. The protection layer 46 is made of an acrylic resin such as PMMA, a polycarbonate-based resin, a polyvinyl chloride (PVC)-based resin, a polyethylene terephthalate-based resin (PET), or a copolymers of any of these, for example. The protection layer 46 may have a layered structure in which a plurality of resin films are layered. When the protection layer 46 is made of an acrylic resin, it is preferably produced by casting method. The thickness of the protection layer 46 is e.g. not less than 0.2 mm and not more than 5.0 mm. The in-plane retardation of the protection layer 46 is e.g. not less than 10 nm and not more than 50 nm. As the protection layer 46, for example, a Technolloy film (Technolloy is a registered trademark) manufactured by Sumika Acrylic Co., Ltd. can be used.

The method of placing the optical stack 40 to be in opposing relationship with the front-side polarizing layer 14 of the display device 10A is not particularly limited. It suffices if the second polarizing layer 42 and the phase difference layer 44 are disposed so as to cover the displaying region of the display plane 10A when the display plane 10A is viewed from the light-transmitting portion 20. FIG. 2A to FIG. 2D are cross-sectional views schematically showing example methods of placing the optical stack 40 to be in opposing relationship with the front-side polarizing layer 14 of the display device 10A.

Figure 2A:
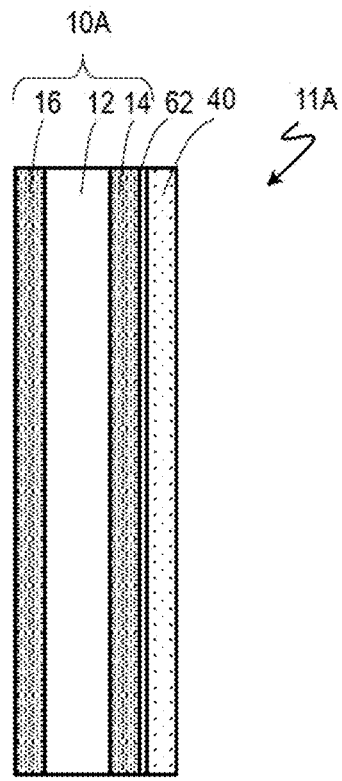
FIG. 2A is a cross-sectional view schematically showing an example method of placing an optical stack 40 to be in opposing relationship with a polarizing layer 14 of the display device 10A.

For example, as shown in FIG. 2A, the optical stack 40 may be bonded to the front-side polarizing layer 14 (i.e., the face of the display device 10A facing the viewer Pi) via an adhesion layer 62. Herein, the adhesion layer 62 is an adhesion layer that is removable from the display device 10A, for example. The optical stack 40 is preferably removable under a particular need which dictates that the optical stack 40 is required only when using the display device 10A within the space 50 but that the optical stack 40 is not required when the display device 10A is used outside the space 50. The display device 10A and the optical stack 40 that is attached onto the display device 10A via the adhesion layer 62 will together be referred to as a display device 11A. The display device 11A includes: a display medium layer (which herein is a liquid crystal layer); the two polarizing layers 14 and 42 provided on the viewer's side of the display medium layer; and the ½ wave plate 48 interposed between the two polarizing layers 14 and 42.

Figure 2B:
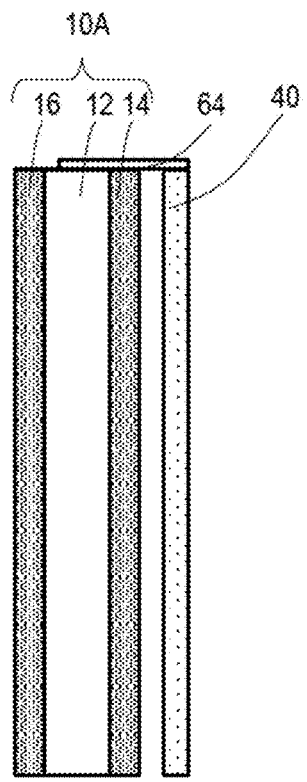
FIG. 2B is a cross-sectional view schematically showing another example method of placing the optical stack 40 to be in opposing relationship with the polarizing layer 14 of the display device 10A.
Figure 2C:
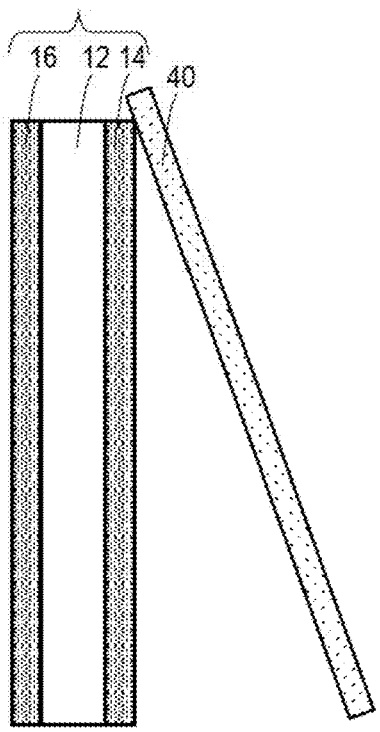
FIG. 2C is a cross-sectional view schematically showing still another example method of placing the optical stack 40 to be in opposing relationship with the polarizing layer 14 of the display device 10A.
Figure 2D:
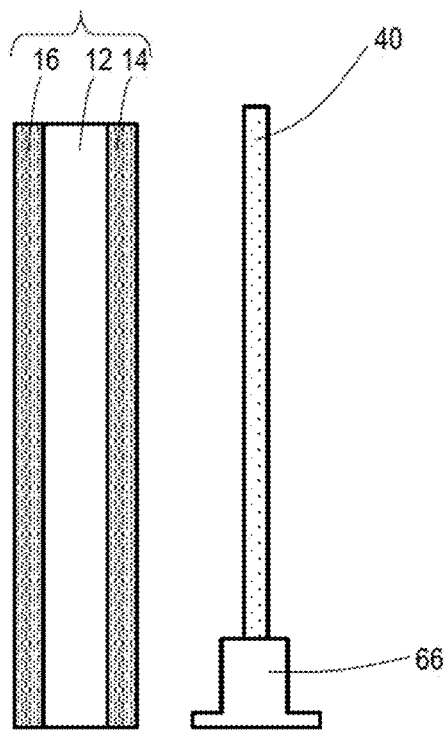
FIG. 2D is a cross-sectional view schematically showing still another example method of placing the optical stack 40 to be in opposing relationship with the polarizing layer 14 of the display device 10A.

Alternatively, as shown in FIG. 2B to FIG. 2D, the optical stack 40 may be disposed with an air layer (or an air gap) between itself and the display device 10A. For example, as shown in FIG. 2B, a protrusion 64 that is substantially orthogonal to a principal face of the optical stack 40, the protrusion 64 being provided in contact with one side of the optical stack 40, may be allowed to rest on the display device 10A so that the optical stack 40 becomes interposed between the display device 10A and the viewer Pi. As shown in FIG. 2C, the optical stack 40 may be leaned against the display device 10A. Alternatively, the optical stack 40 may be made in a self-standing form, and interposed between the display device 10A and the viewer Pi. For example, as shown in FIG. 2D, the optical stack 40 is supported by a stand 66 that is capable of providing support so that a face including a principal face of the optical stack 40 contains the vertical direction.

With reference to FIG. 3A, a peeking prevention system 100B according to another embodiment of the present invention will be described. FIG. 3A is a schematic plan view of the peeking prevention system 100B as seen from above. For those component elements which have substantially the same functions as those in the earlier embodiment, description in the earlier embodiment applies unless otherwise specified. Hereinafter, differences from the earlier embodiment will mainly be described.

The peeking prevention system 100B differs from the peeking prevention system 100A (which includes the liquid crystal display device 10A) in that it includes an LED display device 10B. The LED display device 10B includes a polarizing layer (which may be referred to as the "third polarizing layer" or the "front-side polarizing layer") 14 at the front surface of the display plane. The LED display device 10B further includes: an emission element layer 13 including a plurality of light-emitting elements; and a ¼ wave plate (λ/4 plate) 15 which is interposed between the front-side polarizing layer 14 and the emission element layer 13. The front-side polarizing layer 14 and the λ/4 layer 15 together function as a circular polarizer. The emission element layer 13 includes a plurality of light-emitting elements which are arranged in a two-dimensional array. The LED display device 10B is, for example, an organic EL display device 10B having an organic EL layer 13 that includes a plurality of organic EL elements. Alternatively, the LED display device 10B may be an LED display device (micro LED display device) 10B which includes an emission element layer 13 that includes a plurality of LED chips (micro LEDs).

In the peeking prevention system 100B including the display device 10B, too, similar effects to those of the peeking prevention system 100A are obtained. Since light emitted from the display device 10B is linearly polarized light having been transmitted through the front-side polarizing layer 14, polarized light which is emitted from the display device 10B is transmitted through the phase difference layer and the polarizing layer, as is the polarized light that is emitted from the display device 10A described with reference to FIG. 1B.

Although omitted from illustration, the method of placing the optical stack 40 to be in opposing relationship with the front-side polarizing layer 14 as illustrated in FIG. 2B to FIG. 2D is also applicable to the display device 10B.

Figure 4:
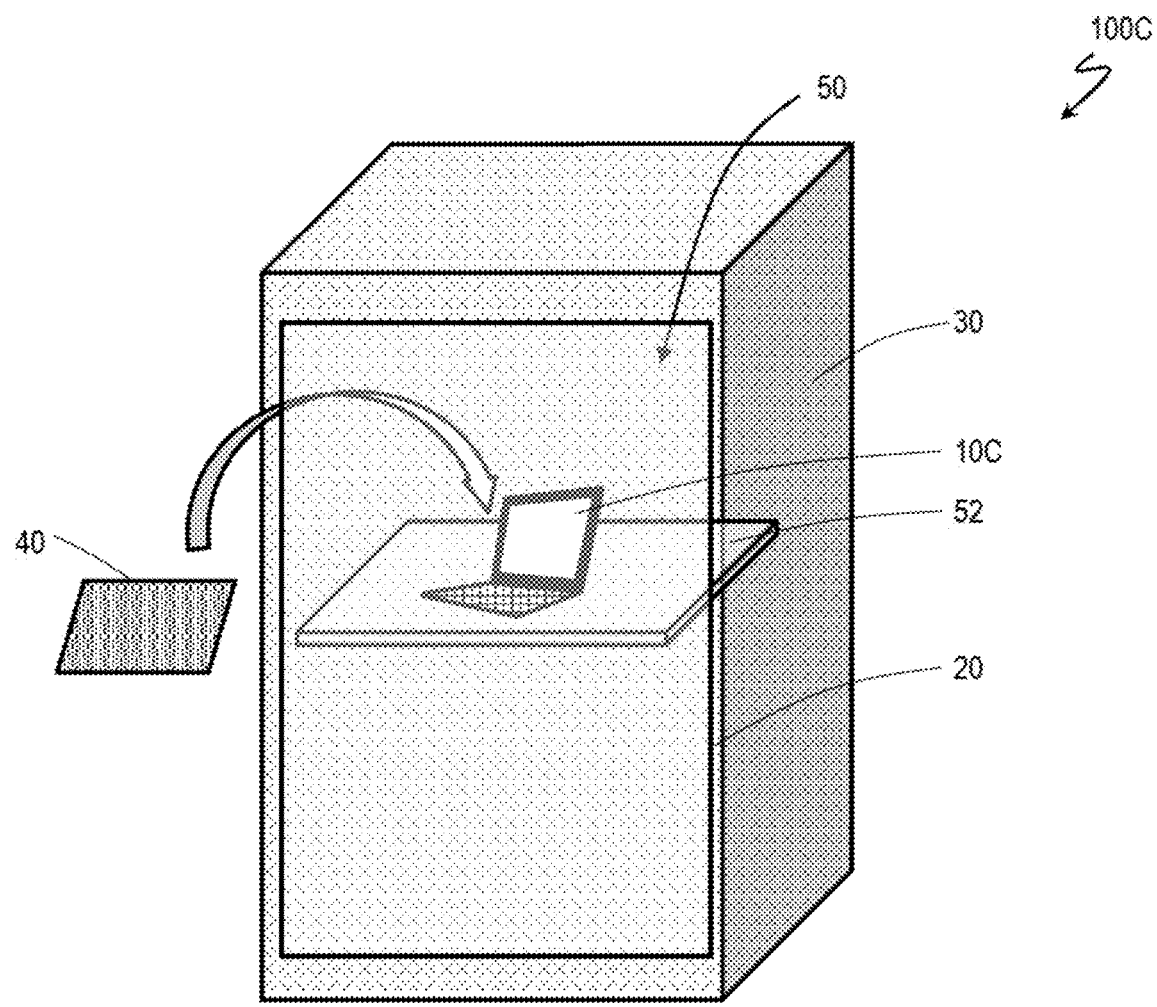
FIG. 4 is a diagram schematically showing a peeking prevention system 100C according to still another embodiment of the present invention.

With reference to FIG. 4, a peeking prevention system 100C according to still another embodiment of the present invention will be described. FIG. 4 is a diagram schematically showing the peeking prevention system 100C. The space 50 in the peeking prevention system 100C is a personal workspace. The space 50, which is a personal workspace, may be installed in an office, or at a public place such as within the premises of a train station, for example. The partition 30 to delimit from the surroundings the space 50 being a personal workspace may be a box type (enclosed-space type) or may be a combination of partition boards. As in the example of FIG. 1A, the first polarizing layer 24 may be provided inside the partition 30 (i.e., within the space 50); or, as in the example of FIG. 1E, the first polarizing layer 24 may be provided outside the partition 30 (i.e., outside of the space 50). The user may place a display device 10C for personal use, e.g., a laptop computer or a tablet, on a base 52 that is provided in space 50, for example. In the meantime, the optical stack 40 can be placed opposing relationship with the display plane 10C of the display device 10C, by using any of the methods described with reference to FIG. 2A to FIG. 2D, for example. As the display device 10C, any of the display devices in the other embodiments already described above.

Experimental Examples will now be described.

Example 1

In order to examine how the display plane 10A of the peeking prevention system 100A appears to the person (viewer) Pi in the space 50, the transmittance of light from a light source having been transmitted through the front-side polarizing layer 14, the ½ wave plate 48, and the second polarizing layer 42 in this order was measured for different wavelengths. The measurements were taken by using a UV-Vis-NIR spectrophotometer V-660 manufactured by Japan Spectroscopic Company. Using a halogen lamp as the light source, transmittances at wavelengths from 300 nm to 780 nm were measured at 5 nm intervals, with a scanning rate of 400 nm/min. By using the transmittance polarized light that was transmitted only through the front-side polarizing layer 14 from the light source as a blank, baseline correction was performed. In other words, the resultant transmittance was normalized against the transmittance of linearly polarized light that was transmitted only through the front-side polarizing layer 14 from the light source as 100%. Measurements were taken for the respective cases where the absorption axis AXa3 of the front-side polarizing layer 14 had an azimuth angle of 0° (horizontal direction), 90° (vertical direction), and 45°.

Figure 5:
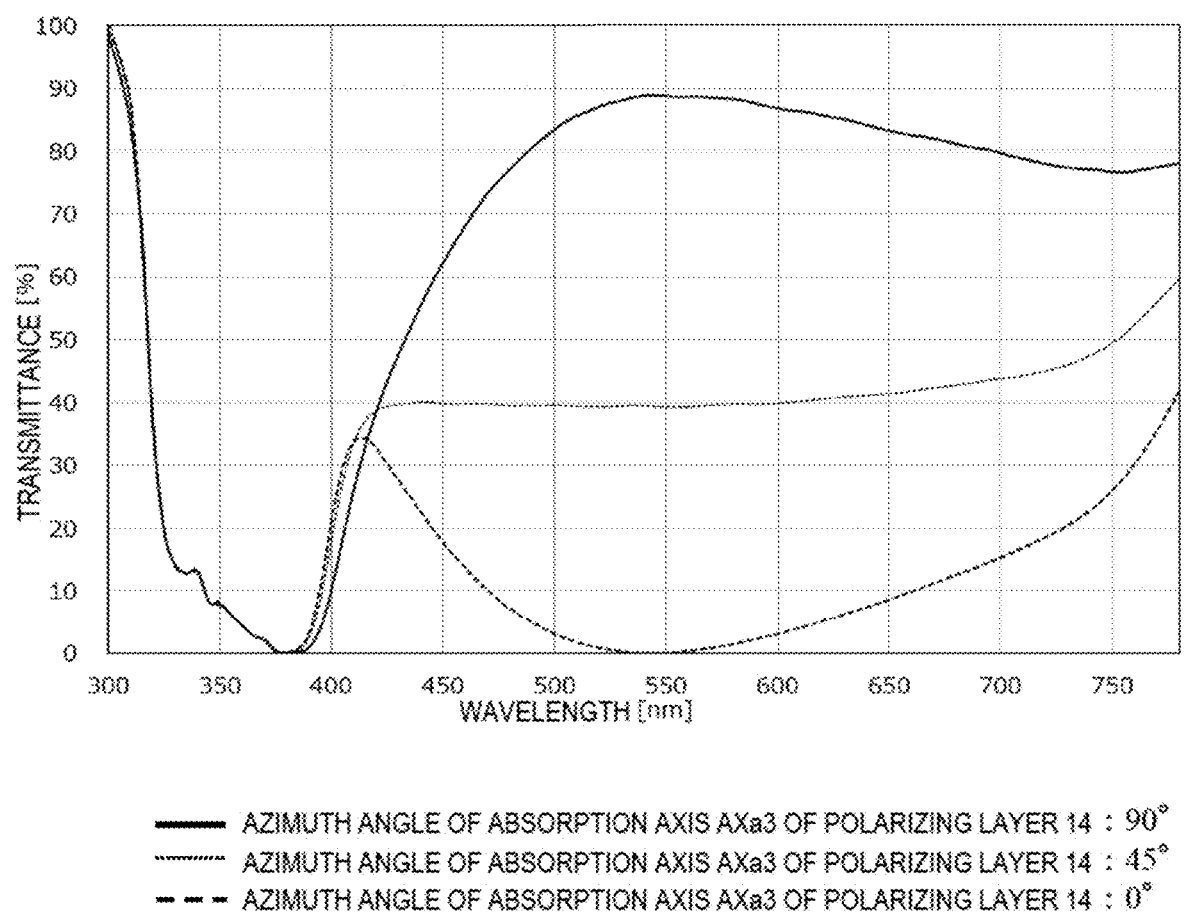
FIG. 5 is a graph showing wavelength dependence of transmittance in Example 1.

The conditions of the polarizing layers and phase difference layer in the measurement system are shown below. FIG. 5 is a graph showing wavelength dependence of transmittance.

slow axis SXr of ½ wave plate 48: azimuth angle 45°
absorption axis AXa2 of second polarizing layer 42: azimuth angle 0° (horizontal direction)
½ wave plate 48: a ½ wave plate made of discotic liquid crystal
method of producing ½ wave plate 48: On one side of a TAC film manufactured by Konica Minolta, Inc. (product name: KC4UY, thickness: 40 μm), an alignment film and an alignment fixed layer containing liquid crystal molecules (½ wave plate 48) were formed according to a method described in <Example 1> of Japanese Laid-Open Patent Publication No. 2014-214177, thereby producing a stack including the ½ wave plate 48. The ½ wave plate 48 had an in-plane phase difference Re (550) of 270 nm, and was formed so that its slow axis made an angle of 45° with the absorption axis AXa2 of the second polarizing layer 42.

second polarizing layer 42: a polarizer with a layer of tackiness agent having a layered structure of TAC protection layer/polarizing element (thickness 29 μm)/TAC protection layer/layer of acrylic tackiness agent (manufactured by Nitto Denko Corporation; product name: "TEG1465DU")

Example 2

Figure 6:
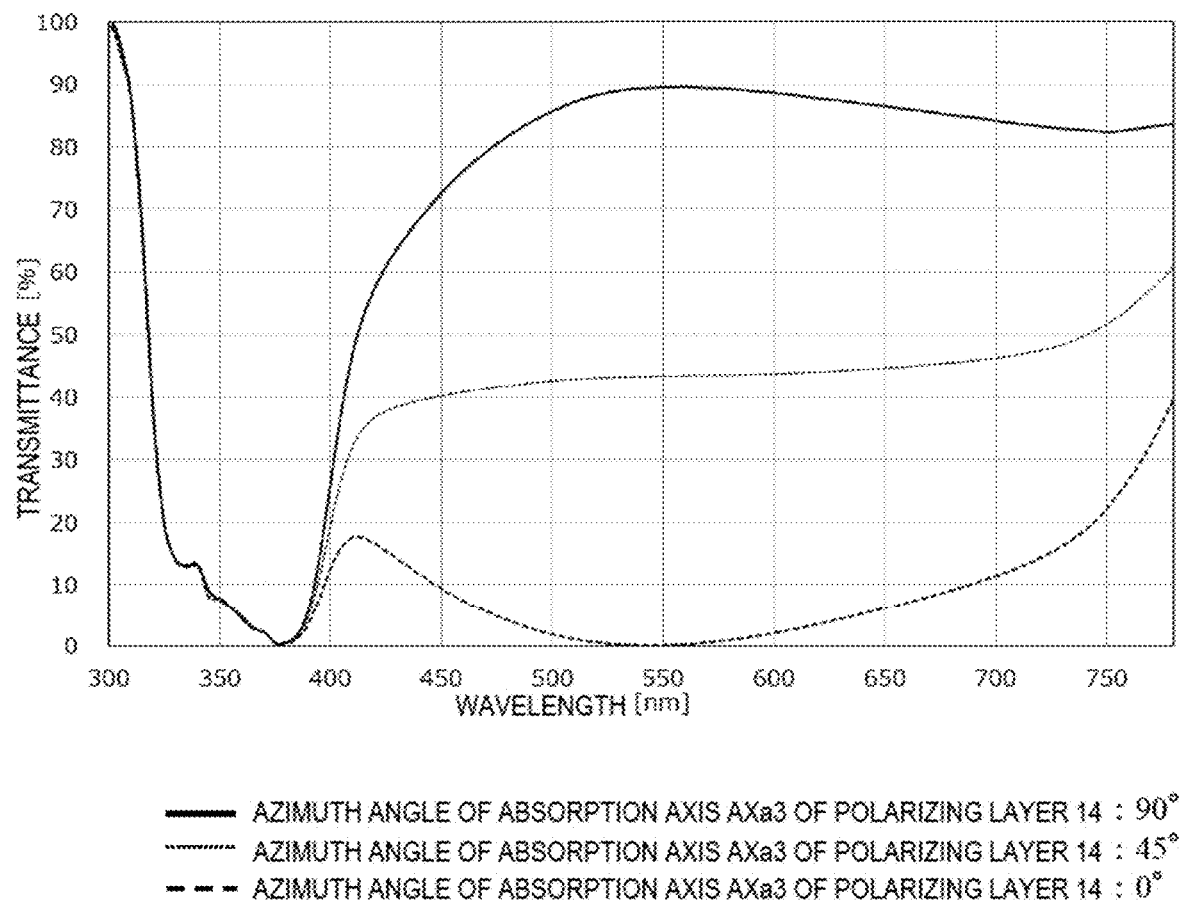
FIG. 6 is a graph showing wavelength dependence of transmittance in Example 2.

Except that the following ½ wave plate 48 was used, measurements were taken similarly to Example 1. FIG. 6 is a graph showing wavelength dependence of transmittance.
½ wave plate 48: a ½ wave plate containing a norbornene-based resin (manufactured by JSR Corporation; product name: "ARTON")

Comparative Example 1

Figure 7:
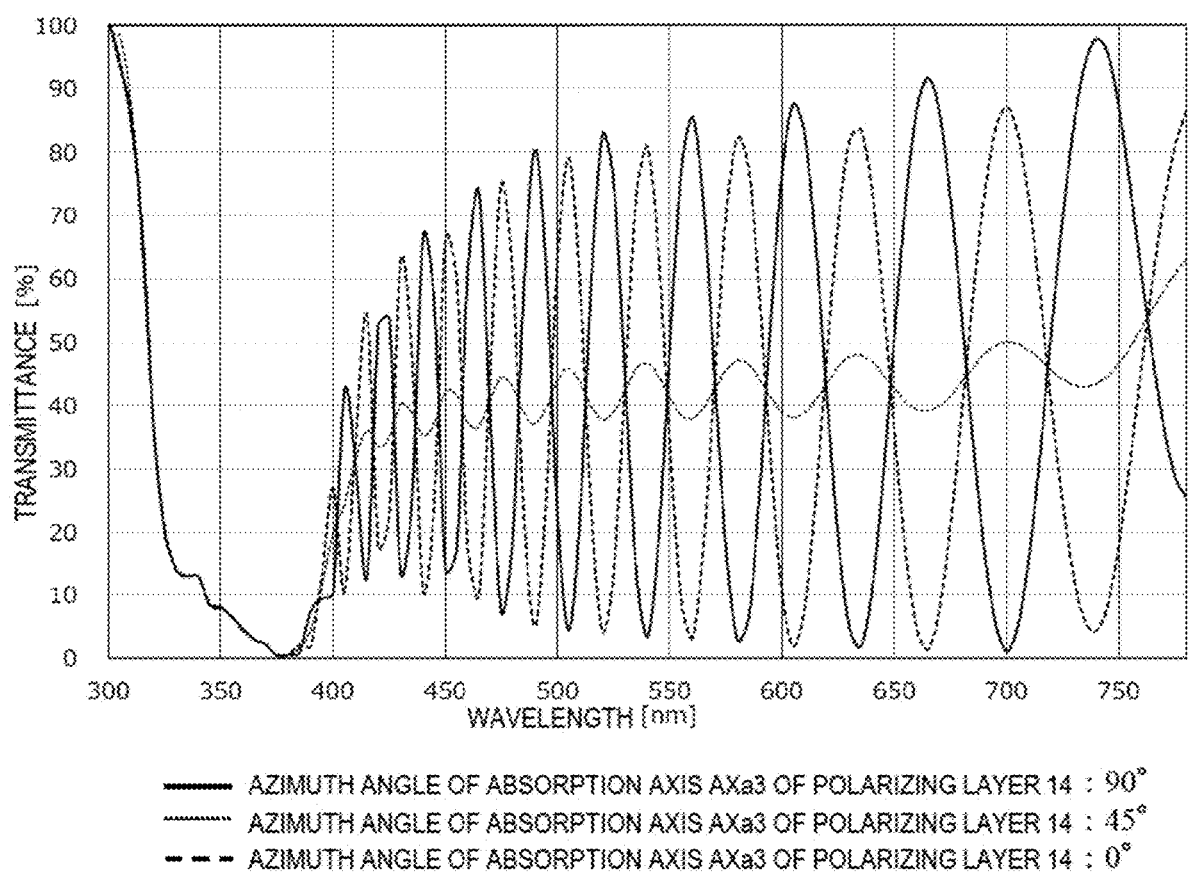
FIG. 7 is a graph showing wavelength dependence of transmittance in Comparative Example 1.

In order to examine how the display plane 10A appears to the person (viewer) Pi in the space 50 of the peeking prevention system 900A according to Comparative Example, the transmittance of light from a light source having been transmitted through the front-side polarizing layer 14, the phase difference layer 44, and the second polarizing layer 42 in this order was measured for different wavelengths. Except for the following conditions, measurements were taken similarly to Example 1. FIG. 7 is a graph showing wavelength dependence of transmittance.
phase difference layer 44: manufactured by TOYOBO CO., LTD.; product name: "COSMOSHINE SRF TA044" ("COSMOSHINE SRF" is a registered trademark)
slow axis SXr of phase difference layer 44: azimuth angle 45°
in-plane retardation of phase difference layer 44: 8400 nm
(Transmittance of Optical Stack)

Figure 8:
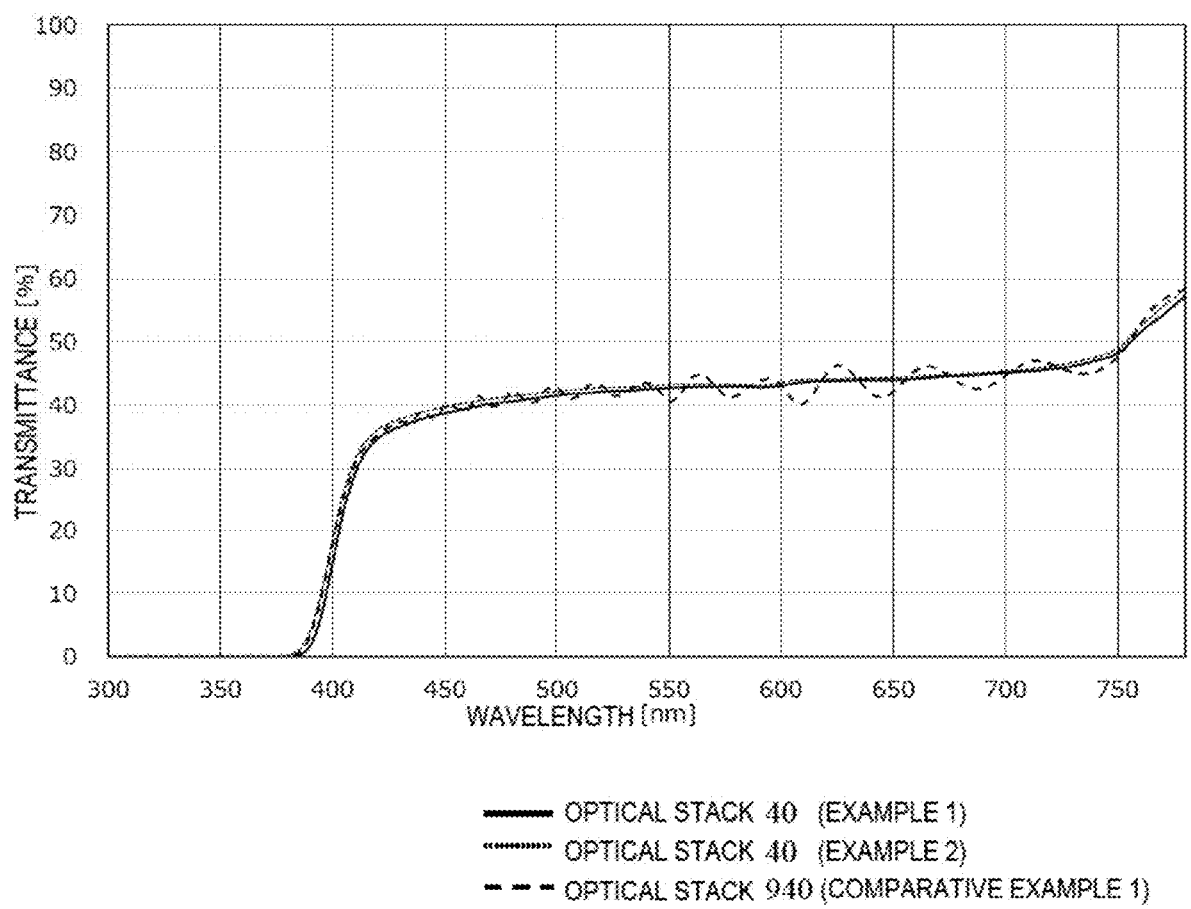
FIG. 8 is a graph showing wavelength dependence of transmittance of an optical stack.

In order to examine the transmittance of the optical stack 40, transmittance of light from the light source that was transmitted only through the ½ wave plate 48 and the second polarizing layer 42 in this order was measured in a similar manner to Example 1 or 2. Similarly, in order to examine the transmittance of the optical stack 940, transmittance of light from the light source that was transmitted only through the phase difference layer 44 and the second polarizing layer 42 in this order was measured in a similar manner to Comparative Example 1. FIG. 8 is a graph showing wavelength dependence of transmittance.

Table 1 shows evaluation results for Examples 1 and 2 and Comparative Example 1. From the results of transmittance measurement in Experimental Examples above, visibility of information displayed on the display plane for the person Pi in the space 50 was evaluated under the following criteria, by using a mean value of transmittance across the entire visible light region (from 380 nm to 780 nm). As for the ability to prevent information displayed on the display plane of the display device from being seen from outside of the space 50 (blinding), evaluation was made by assuming that the absorption axis AXa1 of the first polarizing layer 24 included in the light-transmitting portion 20 had an azimuth angle of 90° (vertical direction). Table 1 also shows mean values of transmittance for Examples 1 and 2 and Comparative Example 1 across the entire visible light region (from 380 nm to 780 nm). Table 1 also illustrates, as "Comparative Example 2", blinding availability of a case where the optical stack is not provided between the display plane of the display device and the light-transmitting portion 20. Note that Comparative Example 2 corresponds to the system described in Patent Document 1, whereas Comparative Example 1 corresponds to the peeking prevention system described in Patent Document 2. Table 1 also shows, as "Reference Example", blinding availability of a case where only the ½ wave plate 48 is used instead of the optical stack 40.
- ⊚: blinding is OK, with a transmittance mean value of 50% or more
- ○: blinding is OK, with a transmittance mean value of 30% or more but less than 50%
- ●: no optical stack is required for blinding (blinding is OK without the optical stack); tinting appears when the display plane is viewed through the optical stack or 90°. On the other hand, when the ½ wave plate 48 used in Example 2 (a ½ wave plate containing a norbornene-based resin) is attached onto the second polarizing layer 42 by roll-to-roll method, an angle made by its slow axis SXr and the Machine Direction is 45°. Because the ½ wave plate used in Example 1 (a ½ wave plate containing a discotic liquid crystal) is suitable for producing the optical stack 40 in roll-to-roll fashion, it provides for improved mass producibility.

In Comparative Example 1, information that is displayed on the display plane can be prevented from being seen from outside of the space 50 irrespective of the polarization direction of linearly polarized light that is emitted from the

TABLE 1

| | optical stack | angle made by slow axis SXr of λ/2 plate 48 (or phase difference layer 44) and absorption axis AXa3 of polarizing layer 14 | azimuth angle of absorption axis AXa3 of polarizing layer 14: 0° | azimuth angle of absorption axis AXa3 of polarizing layer 14: 90° | azimuth angle of absorption axis AXa3 of polarizing layer 14: 45° |
|---|---|---|---|---|---|
| Ex. 1 | optical stack 40 (λ/2 plate 48) | 45° | ● | ⊚ (transmittance mean value: 72.4%) | ○ (transmittance mean value: 39.7%) |
| Ex. 2 | optical stack 40 (λ/2 plate 48) | 45° | ● | ⊚ (transmittance mean value: 77.6%) | ○ (transmittance mean value: 42.1%) |
| Comp. Ex. 1 | optical stack 940 (phase difference layer 44) | 45° | ○ (transmittance mean value: 40.0%) | ○ (transmittance mean value: 43.1%) | ○ (transmittance mean value: 40.9%) |
| Comp. Ex. 2 | no optical stack | — | blinding OK | blinding NG | blinding NG |
| Ref. Ex. | λ/2 plate 48 only | azimuth angle of slow axis SXr of λ/2 plate 48: 45° | blinding NG | blinding OK | blinding NG |

In both Examples 1 and 2, information that is displayed on the display plane can be prevented from being seen from outside of the space 50 irrespective of the polarization direction of linearly polarized light that is emitted from the display plane of the display device, and visibility of the information displayed on the display plane for the person Pi in the space 50 is good. Between Example 1 and Example 2, Example 2 provides higher transmittance, which may be more preferable from the standpoint of visibility of the information.

From the standpoint of the production cost of the optical stack 40, the ½ wave plate used in Example 1 may be preferable to the ½ wave plate used in Example 2. The optical stack 40 may be produced by attaching together the ½ wave plate 48 and the second polarizing layer 42 by roll-to-roll method, for example. When two films of elongated shape are attached together by roll-to-roll method, the two films move along the longitudinal direction of the film (the "Machine Direction"). In the ½ wave plate used in Example 1 (a ½ wave plate containing a discotic liquid crystal), an angle made by its slow axis SXr and the longitudinal direction of the film is 0° or 90°. In other words, when the ½ wave plate used in Example 1 (a ½ wave plate containing a discotic liquid crystal) is attached onto the second polarizing layer 42 by roll-to-roll method, an angle made by its slow axis SXr and the Machine Direction is 0° display plane of the display device, but visibility of the information displayed on the display plane may be inferior to that in Examples 1 and 2. In particular, Examples 1 and 2 provide improved visibility of the information displayed on the display plane for the person Pi in the space 50 over Comparative Example 1 in the case where the polarization direction of linearly polarized light that is emitted from the display plane of the display device is parallel to the polarization axis AXp1 of the first polarizing layer 24 in the light-transmitting portion 20 (i.e., when the absorption axis AXa3 of the polarizing layer 14 provided on the front surface of the display plane of the display device and the absorption axis AXa1 of the first polarizing layer 24 in the light-transmitting portion 20 are parallel). As shown in Table 1, mean values of transmittance across the entire visible light region obtained in Experimental Examples were about 80% (e.g., 70% or more) in Examples 1 and 2, as compared to about 40% in Comparative Example 1.

In Comparative Example 2, in which no optical stack is provided between the display plane of the display device and the light-transmitting portion 20, prevention of information displayed on the display plane from being seen from outside of the space 50 (blinding) is only achieved in the case where the polarization direction of linearly polarized light that is emitted from the display plane of the display device is orthogonal to the polarization axis AXp1 of the first polarizing layer 24 in the light-transmitting portion 20 (i.e., when the absorption axis AXa3 of the polarizing layer 14 provided on the front surface of the display plane of the display device and the absorption axis AXa1 of the first polarizing layer 24 in the light-transmitting portion 20 are orthogonal). In Reference Example, in which only the ½ wave plate 48 is used instead of the optical stack 40, prevention of information displayed on the display plane from being seen from outside of the space 50 (blinding) is only achieved in the case where the polarization direction of linearly polarized light that is emitted from the display plane of the display device is parallel to the polarization axis AXp1 of the first polarizing layer 24 in the light-transmitting portion 20 (i.e., when the absorption axis AXa3 of the polarizing layer 14 provided on the front surface of the display plane of the display device and the absorption axis AXa1 of the first polarizing layer 24 in the light-transmitting portion 20 are parallel).

(Production of Polarizer)

Other than the polarizer used as the second polarizing layer 42 in Experimental Examples above, a polarizer which is produced in the following manner can also be used. A polarizer which is produced in the following manner includes a polarizing element that is thinner than the polarizing element included in the polarizer used in Experimental Example above, as well as a protection layer.

As a thermoplastic resin substrate, an amorphous isophthalic copolymerized polyethylene terephthalate film (thickness: 100 μm) of an elongated shape, having a Tg of about 75° C., was used, and one side of the resin substrate was subjected to a corona treatment.

To 100 mass parts of PVA-based resin, which was a 9:1 mixture of polyvinyl alcohol (degree of polymerization 4200, 99.2 mol % saponification) and acetoacetyl-modified PVA (Nippon Synthetic Chemical Industry Co., Ltd.; product name: "GOHSEFIMER"), 13 mass parts of potassium iodide were added, and this was dissolved in water. Thus, an aqueous solution of PVA (coating solution) was prepared.

On the corona-treated surface of the resin substrate, the aforementioned aqueous solution of PVA was applied, and this was dried at 60° C., thereby forming a PVA-based resin layer having a thickness of 13 μm. Thus, a stack was produced.

The resultant stack was uniaxially stretched to 2.4 times in a longitudinal direction, in an oven at 130° C. (aerial supplementary stretching treatment).

Next, the stack was immersed in an insolubilizing bath (an aqueous boric acid solution obtained by blending 4 mass parts of boric acid to 100 mass parts of water) at a liquid temperature of 40° C. for 30 seconds (insolubilization treatment).

Next, the stack was immersed in a dyeing bath (an aqueous iodine solution obtained by blending iodine and potassium iodide at a mass ratio of 1:7 for 100 mass parts of water) at a liquid temperature of 30° C. for 60 seconds, while adjusting the concentration so that the single transmittance (Ts) of the finally obtained polarizing element had a desired value (dyeing treatment).

Next, the stack was immersed in a cross-linking bath (an aqueous boric acid solution obtained by blending 3 mass parts of potassium iodide and 5 mass parts of boric acid to 100 mass parts of water) at a liquid temperature of 40° C. for 30 seconds (cross-linking treatment).

Thereafter, the stack was uniaxially stretched between rolls with different peripheral speeds while immersed in an aqueous boric acid solution (boric acid concentration 4 mass %, potassium iodide concentration 5 mass %) at a liquid temperature of 70° C., to achieve a total stretching ratio of 5.5 times in the longitudinal direction (stretch-in-water treatment).

Thereafter, the stack was immersed in a cleaning bath (an aqueous solution obtained by blending 4 mass parts of potassium iodide to 100 mass parts of water) at a liquid temperature of 20° C. (washing treatment).

Then, while drying in an oven maintained at about 90° C., it was placed in contact with a heating roll made of SUS whose surface temperature was maintained at about 75° C. (dry shrink treatment).

In this manner, a polarizing element having a thickness of about 5 μm was formed on the resin substrate, thereby providing a stack having a resin substrate/polarizing element structure.

On a surface (the surface away from the resin substrate) of the polarizing element obtained as above, a triacetyl cellulose (TAC) film with a hard coat layer (hard coat layer thickness 3 μm, TAC thickness 25 μm) was attached as a protection layer, via a UV-curable adhesive. Next, the resin substrate was peeled off, whereby a polarizer having a polarizing element/TAC protection layer structure was obtained. The resultant polarizing element had a single transmittance of 43% and a degree of polarization of 99.9%.

A peeking prevention system, a method of using the same, and a method of peeking prevention according to embodiments of the present invention have improved convenience, and are easy to use for the user.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2022-154660 filed on Sep. 28, 2022, the entire contents of which are hereby incorporated by reference.

What is claimed is:

1. A display device having a display plane from which to emit linearly polarized light;
   a partition to delimit from surroundings a space in which displaying is to be provided by the display device, the partition having a light-transmitting portion through which the inside of the space is viewable; and
   an optical stack placeable in opposing relationship with the display plane of the display device, wherein,
   the light-transmitting portion includes a transparent substrate and a first polarizing layer, the first polarizing layer having a first absorption axis that is parallel to a first direction; and
   the optical stack includes
      a second polarizing layer having a second absorption axis that is parallel to a second direction, the second direction being orthogonal to the first direction, and
      a ½ wave plate disposed at a side of the second polarizing layer facing the display plane.

2. The peeking prevention system of claim 1, wherein,
   the display device includes a third polarizing layer on a front surface of the display plane; and
   the third polarizing layer has a third absorption axis that is parallel to a third direction, the third direction not being orthogonal to the first direction.

3. The peeking prevention system of claim 2, wherein an angle made by a slow axis of the ½ wave plate and the third direction is not less than 35° and not more than 55°.

4. The peeking prevention system of claim 1, wherein the ½ wave plate comprises a discotic liquid crystal.

5. The peeking prevention system of claim 1, wherein the ½ wave plate comprises a norbornene-based resin.

6. The peeking prevention system of claim 2, wherein the third direction is parallel to the first direction.

7. The peeking prevention system of claim 2, wherein an angle made by the third direction and the first direction is 45°.

8. The peeking prevention system of claim 1, wherein the optical stack further includes a protection layer disposed at an opposite side of the second polarizing layer from the ½ wave plate.

9. The peeking prevention system of claim 1, wherein the optical stack is disposed with an air layer between itself and the display device.

10. The peeking prevention system of claim 1, wherein the first direction is a vertical direction and the second direction is a horizontal direction.

11. The peeking prevention system of claim 1, wherein the space is a personal workspace.

12. A method of using the peeking prevention system of claim 1, wherein,
- if the display plane appears tinted in a purple color to a user being in the space and watching the display plane of the display device through the optical stack, the display device is used in the space without the optical stack being placed in opposing relationship with the display plane; and
- if the display plane does not appear tinted in a purple color to a user being in the space and watching the display plane of the display device through the optical stack, the display device is used in the space while the optical stack is placed in opposing relationship with the display plane.

13. A method of peeking prevention for use with a peeking prevention system that includes:
- a display device; and
- a partition to delimit from surroundings a space in which displaying is to be provided by the display device, the partition having a light-transmitting portion through which the inside of the space is viewable,
- the light-transmitting portion including: a transparent substrate; and a first polarizing layer being disposed at a side of the transparent substrate facing the space and having a first absorption axis parallel to a first direction, wherein the method comprises
- placing an optical stack to be in opposing relationship with a display plane of the display device, to reduce a transmittance when the display plane is viewed through the light-transmitting portion, the optical stack including: a second polarizing layer having a second absorption axis that is parallel to a second direction, the second direction being orthogonal to the first direction; and a ½ wave plate disposed at a side of the second polarizing layer facing the display plane.

14. The method of peeking prevention of claim 13, further comprising providing the optical stack by attaching together the second polarizing layer and the ½ wave plate by roll-to-roll method.

* * * * *